(12) United States Patent
Hosono et al.

(10) Patent No.: US 6,439,262 B1
(45) Date of Patent: Aug. 27, 2002

(54) PRESSURE-ADJUSTING MECHANISM

(75) Inventors: Masayuki Hosono, Toride; Toshio Sato, Tsukuba; Seikai Yo, Ichikawa, all of (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 09/691,841

(22) Filed: Oct. 18, 2000

(30) Foreign Application Priority Data

Oct. 18, 1999 (JP) .......................................... 11-295936

(51) Int. Cl.[7] .............................................. G05D 16/10
(52) U.S. Cl. ................. 137/505.41; 137/382; 137/556.6
(58) Field of Search ....................... 137/505.18, 505.41, 137/556.6, 382, 613

(56) References Cited

U.S. PATENT DOCUMENTS

| 1,231,293 A | * | 6/1917 | Peters ...................... 137/556.6 |
| 1,668,223 A | * | 5/1928 | Utman ........................ 137/382 |
| 1,949,106 A | * | 2/1934 | Manneschmidt ............ 137/495 |
| 2,514,025 A | * | 7/1950 | Bush ........................ 137/556.6 |
| 2,742,764 A | * | 4/1956 | St. Clair ..................... 137/113 |
| 3,885,589 A | * | 5/1975 | Lung ..................... 137/505.35 |
| 5,393,035 A | * | 2/1995 | Steele ..................... 137/556.6 |

* cited by examiner

*Primary Examiner*—Stephen M. Hepperle
(74) *Attorney, Agent, or Firm*—Paul A. Guss

(57) ABSTRACT

Disclosed is a pressure-adjusting mechanism comprising a pressure-adjusting handle, a pressure-adjusting screw for adjusting resilient force of a spring member by making rotation integrally with the pressure-adjusting handle, and a pressure-setting scale for indicating a preset pressure value by rotating the pressure-adjusting handle in a predetermined direction. As a result, it is possible to obtain the pressure-adjusting mechanism which is constructed integrally with a pressure control valve owing to a simple structure and which makes it possible to easily adjust the pressure by an operator.

7 Claims, 11 Drawing Sheets

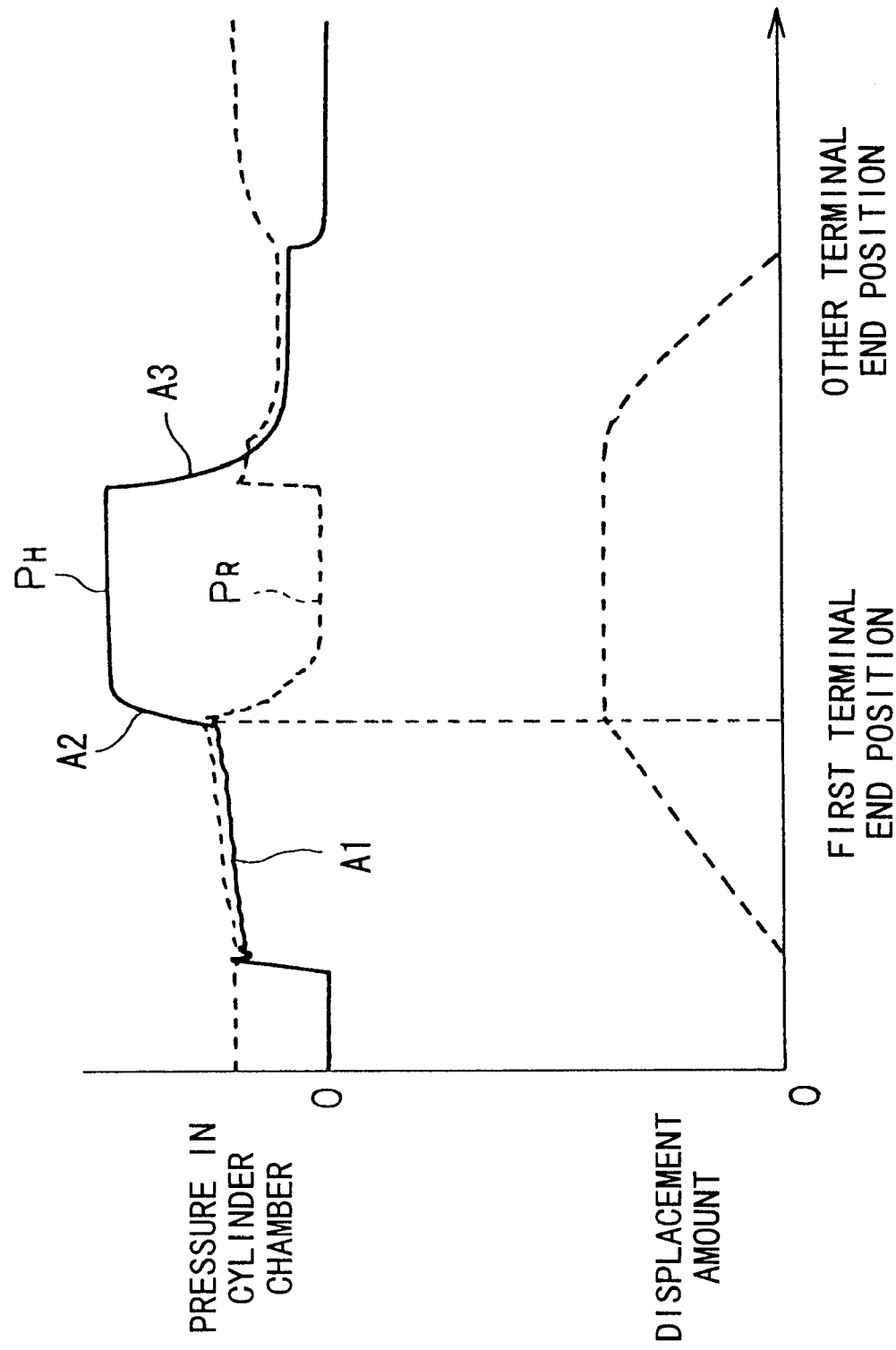
FIG. 10 (PRESENT EMBODIMENT)

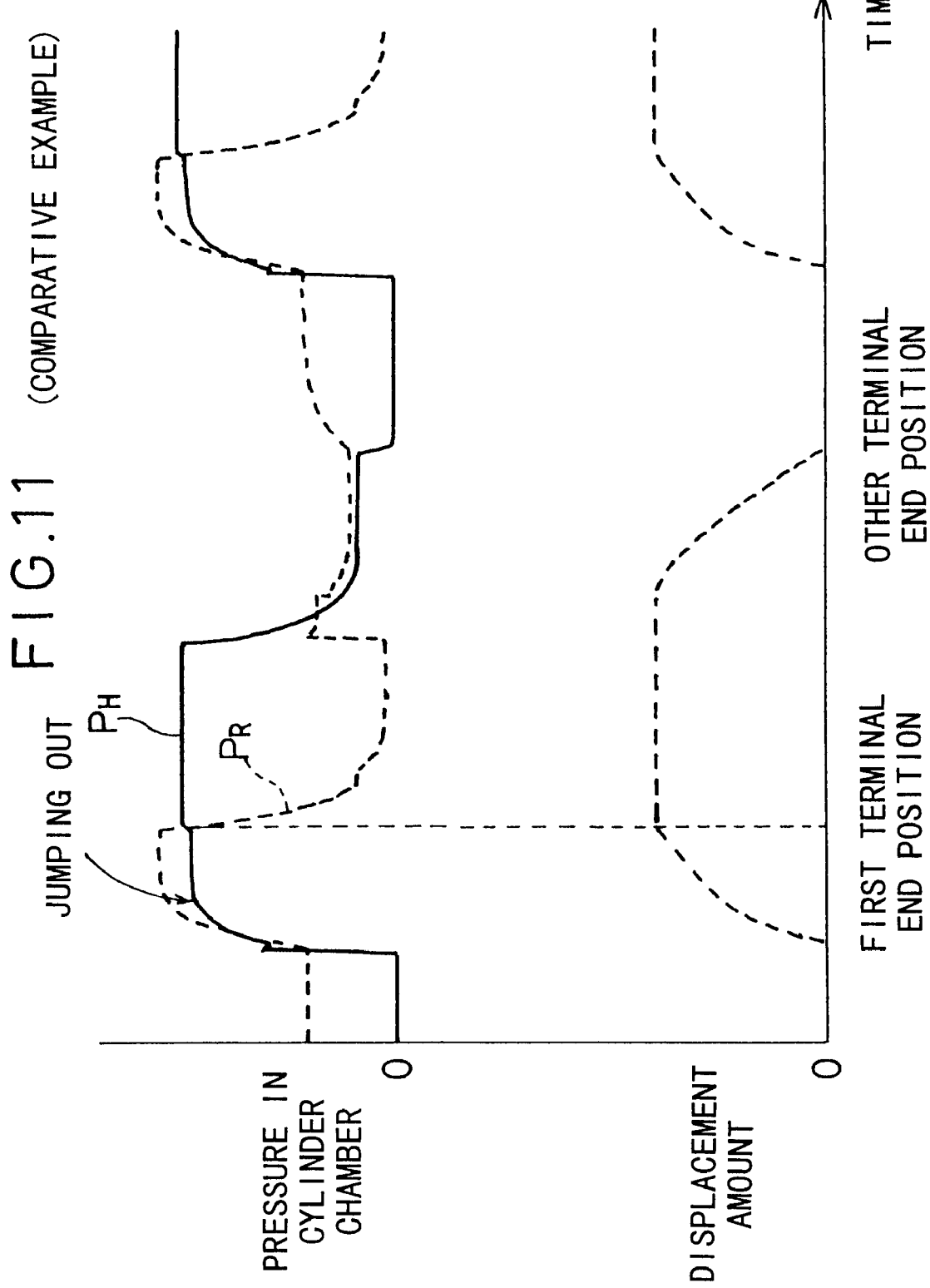
FIG. 11 (COMPARATIVE EXAMPLE)

PRESSURE-ADJUSTING MECHANISM

BACKGROUND OF THE INVENTION

1. Field of the Invention

The present invention relates to a pressure-adjusting mechanism which makes it possible to conveniently adjust the pressure of a pressure fluid to be supplied to an actuator such as a cylinder.

2. Description of the Related Art

A pressure control valve has been hitherto used in order to control the pressure of a pressure fluid to be supplied, for example, an actuator such as a cylinder. When the medium to be used is air, the pressure control valve functions to control the pneumatic pressure in a pneumatic pressure system depending on the purpose of use in each case.

When the secondary pressure, which is controlled by the pressure control valve, is adjusted (including, for example, the setting and the resetting of the secondary pressure), the following operation is performed. That is, for example, a pressure gauge is installed in a passage through which a secondary port of the pressure control valve communicates with a fluid pressure-operated apparatus. The secondary pressure, which is supplied to the fluid pressure-operated apparatus, is measured by using the pressure gauge. An operator adjusts the secondary pressure of the pressure control valve, while visually confirming the pointer of the pressure gauge.

In other words, in the case of the pressure control valve concerning the conventional technique, the mechanism for indicating the secondary pressure to be set is not provided for the pressure control valve itself. Therefore, it is necessary that a measuring apparatus such as a pressure gauge is simultaneously used to adjust the secondary pressure.

However, in the case of the pressure control valve concerning the conventional technique as described above, it is necessary to attach and detach the pressure gauge every time when the secondary pressure is adjusted. The attachment/detachment operation is complicated. Further, it is difficult in some cases to install the pressure gauge in the passage which makes communication between the secondary port of the pressure control valve and the fluid pressure-operated apparatus corresponding to a narrow installation environment.

SUMMARY OF THE INVENTION

A general object of the present invention is to provide a pressure-adjusting mechanism which can be constructed integrally with a pressure control valve owing to a simple structure and which makes it possible to easily adjust the pressure by an operator.

A principal object of the present invention is to provide a pressure-adjusting mechanism which makes it possible to set a desired pressure value with ease and which makes it possible to conveniently perform the setting operation for the pressure and the resetting operation for the pressure.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 illustrates a characteristic curve of the second pressure/flow rate control valve shown in FIG. 7; and FIG. 11 illustrates a characteristic curve of a pressure/flow rate control valve concerning Comparative Example.

DESCRIPTION OF THE PREFERRED EMBODIMENTS

Figure 1:
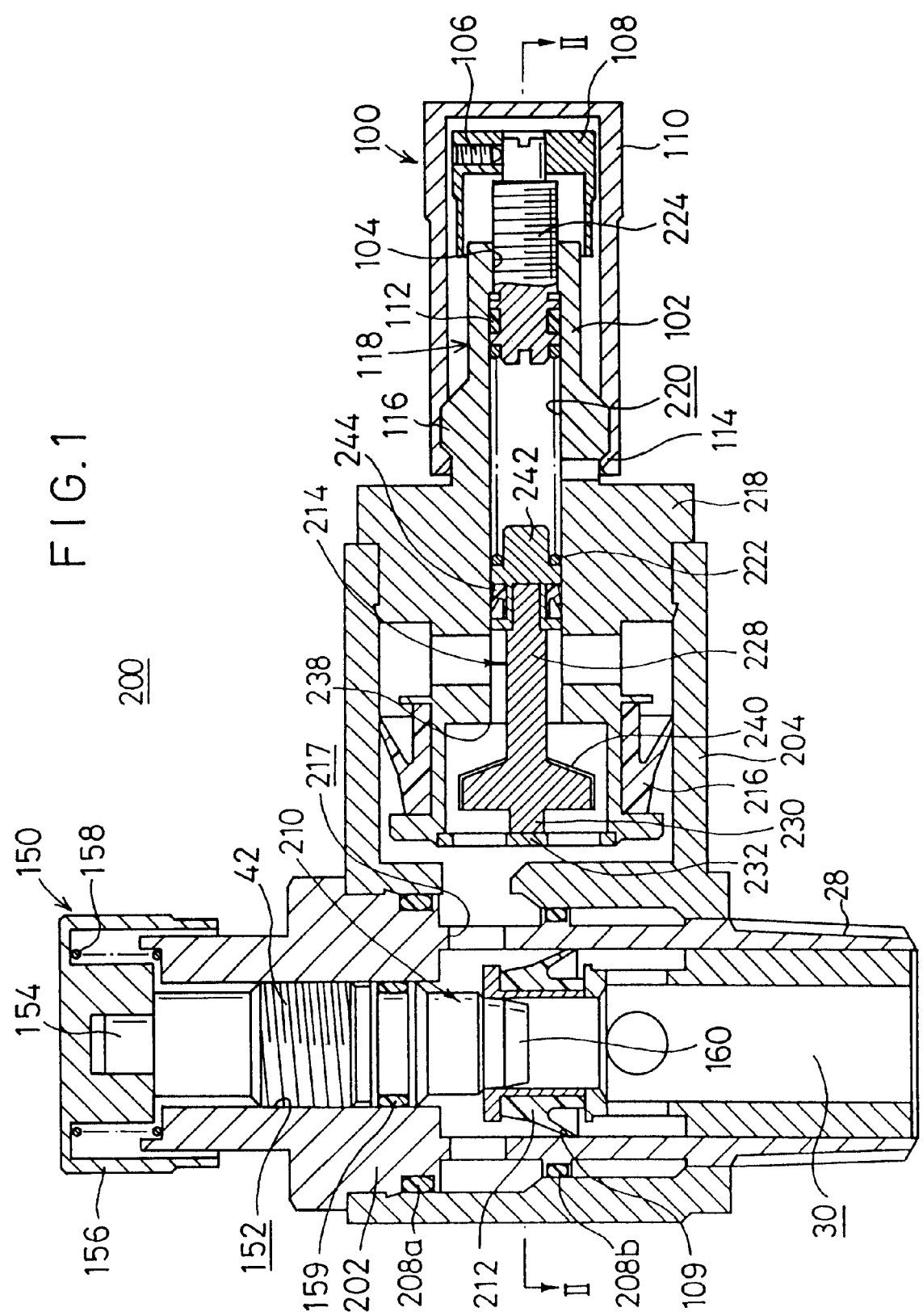
FIG. 1 shows a vertical sectional view illustrating an arrangement of a first pressure/flow rate control valve to which a pressure-adjusting mechanism according to an embodiment of the present invention is applied.

FIG. 1 shows a vertical sectional view illustrating an arrangement in which a pressure-adjusting mechanism 100 according to an embodiment of the present invention is applied to a first pressure/flow rate control valve 200.

The first pressure/flow rate control valve 200 comprises a second valve body 204 which includes two substantially cylindrical members connected in an integrated manner in directions substantially perpendicular to one another and which is provided rotatably about a center of rotation of an axis of an internally fitted cylindrical first valve body 202, and a third valve body 206 (see FIG. 2) which is connected rotatably about a center of rotation of a projection 16 of the second valve body 204.

Ring-shaped first and second seal members 208a, 208b are installed to annular grooves on the outer circumferential surface of the first valve body 202. A ring-shaped third seal member 208c is installed to an annular groove at a connecting portion between the second valve body 204 and the third valve body 206 (see FIG. 2). A tube joint section 22, which is connected to a pressure fluid supply source via an unillustrated tube, is provided at a first end of the third valve body 206.

As shown in FIG. 1, a first check valve 212 and a flow rate-adjusting section 210 for adjusting the flow rate of the pressure fluid supplied from a primary port 24 (see FIG. 2) are provided substantially coaxially at the inside of the first valve body 202. A pressure-adjusting section 214 and a second check valve 216 are provided coaxially in a direction substantially perpendicular to the axis of the first valve body 202 at the inside of the second valve body 204. A communication passage 217, which makes communication between the flow rate-adjusting section 210 and the pressure-adjusting section 214, is formed at a connecting portion between the first valve body 202 and the second valve body 204.

The flow rate-adjusting section 210 has a flow rate-adjusting mechanism 150. The flow rate-adjusting mechanism 150 includes an adjusting screw member 42 which extends along a stepped through-hole 152 formed at a central portion of the second valve body 204 and which is held rotatably in the stepped through-hole 152, a flow rate-adjusting handle 156 which is rotatable integrally with the adjusting screw member 42 with a first end 154 of the adjusting acme 42 forcibly inserted and fitted into a hole, and a spring member 158 which functions to prevent the flow rate-adjusting handle 156 from being loosened by being pressed in a direction in which the flow rate-adjusting handle 156 is separated from the adjusting screw member 42 in accordance with the resilient force. Reference numeral 159 indicates an O-ring which is installed to an intermediate portion of the adjusting screw member 42.

A second end 160 of the adjusting screw member 42 is formed to have a substantially tapered cross section. The spacing distance between the second end 160 of the adjusting screw member 42 and the inner wall surface of the stepped through-hole 152 is adjusted by rotating the flow rate-adjusting handle 156 in a predetermined direction to increase or decrease the screwing amount of the adjusting screw member 42. Therefore, the pressure fluid, which flows through the stepped through-hole 152, is throttled to have a predetermined flow rate in accordance with the spacing distance between the second end 160 of the adjusting screw member 42 and the inner wall surface of the stepped through-hole 152.

Figure 3:
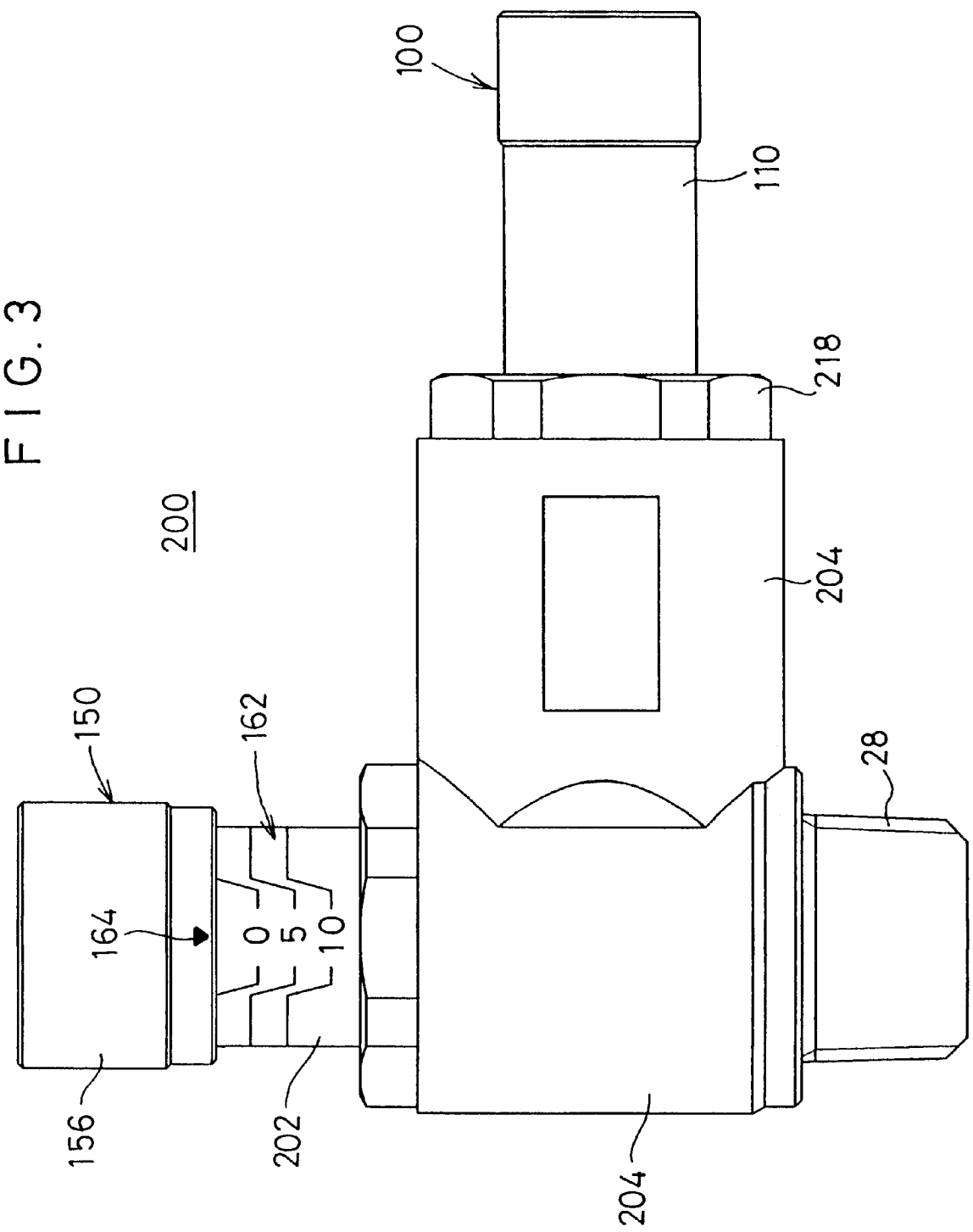
FIG. 3 shows a side view illustrating the first pressure/flow rate control valve.

As shown in FIG. 3, the number of revolution of the adjusting screw member 42 screwed as described above is indicated to be visually confirmable by the aid of a number of revolution-setting scale 162 formed on the outer circumferential surface of the first valve body 202. Therefore, when the first pressure/flow rate control valve 200 is exchanged with another new one, the same throttle amount as that hitherto used can be set again with ease by setting the same number of revolution as the number of revolution having been indicated by the number of revolution-setting scale 162. For example, "0" of the number of revolution-setting scale 162 indicates 0 turn, "5" of the number of revolution-setting scale 162 indicates 5 turns, and "10" of the number of revolution-setting scale 162 indicates 10 turns.

The number of revolution of the adjusting screw member 42 is visually confirmed by reading the numerical value of the number of revolution-setting scale 162 corresponding to a triangular mark 164 which is provided on the outer circumferential surface of the flow rate-adjusting handle 156.

As shown in FIG. 1, the pressure-adjusting section 214 includes a cap member 218 which is connected to an opening of the second valve body 204, and the pressure-adjusting mechanism 100 which is provided on the first end side of the cap member 218.

The pressure-adjusting mechanism 100 comprises a pressure-adjusting screw 224 which is engaged with a thread section 104 of a through-hole 220 formed through a projection 102 of the cap member 218, for setting the resilient force of a spring member (pressure-adjusting spring) 222 described later on by increasing or decreasing the screwing amount with respect to the thread section 104, a pressure-adjusting handle 108 which is fixed to a first end of the pressure-adjusting screw 224 by the aid of a fixing screw 106, for making rotation integrally with the pressure-adjusting screw 224, and a cylindrical bottom-equipped cover member 110 which surround the pressure-adjusting handle 108 and the projection 102 of the cap member 218.

The pressure-adjusting screw 224 is installed with an O-ring 112 which slidably contacts with the inner circumferential surface of the projection 102. The O-ring 112 functions to prevent the pressure-adjusting handle 108 from being loosened. The pressure-adjusting screw 224 is provided displaceably by a minute distance in the axial direction, and it is provided rotatably in the circumferential direction. The pressure-adjusting screw 224 is fixed at an arbitrary position adjusted in the axial direction and in the circumferential direction by the aid of the fixing screw 106 provided for the pressure-adjusting handle 108.

Figure 2:
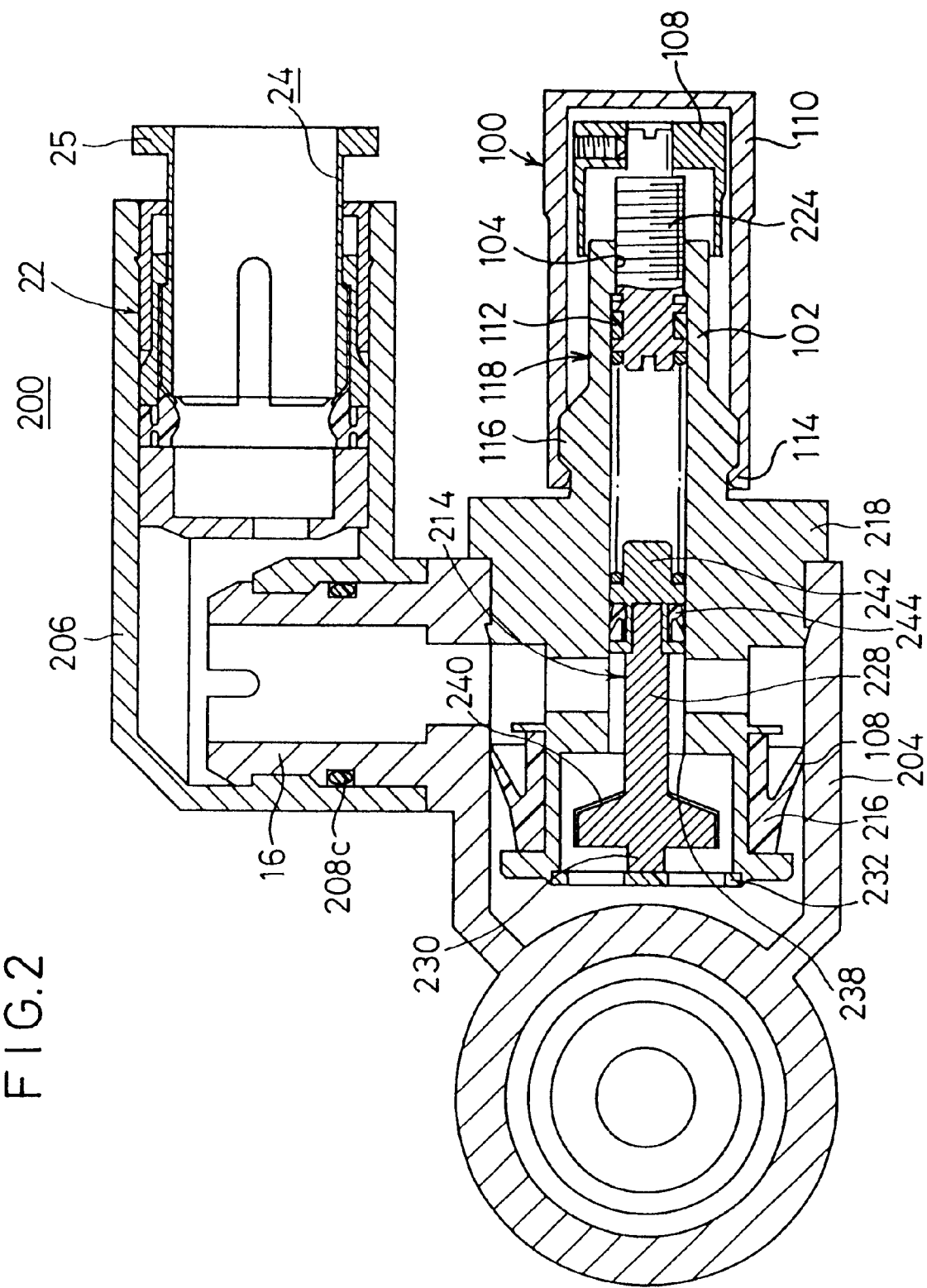
FIG. 2 shows a vertical sectional view taken along a line II—II shown in FIG. 1.
Figure 4:
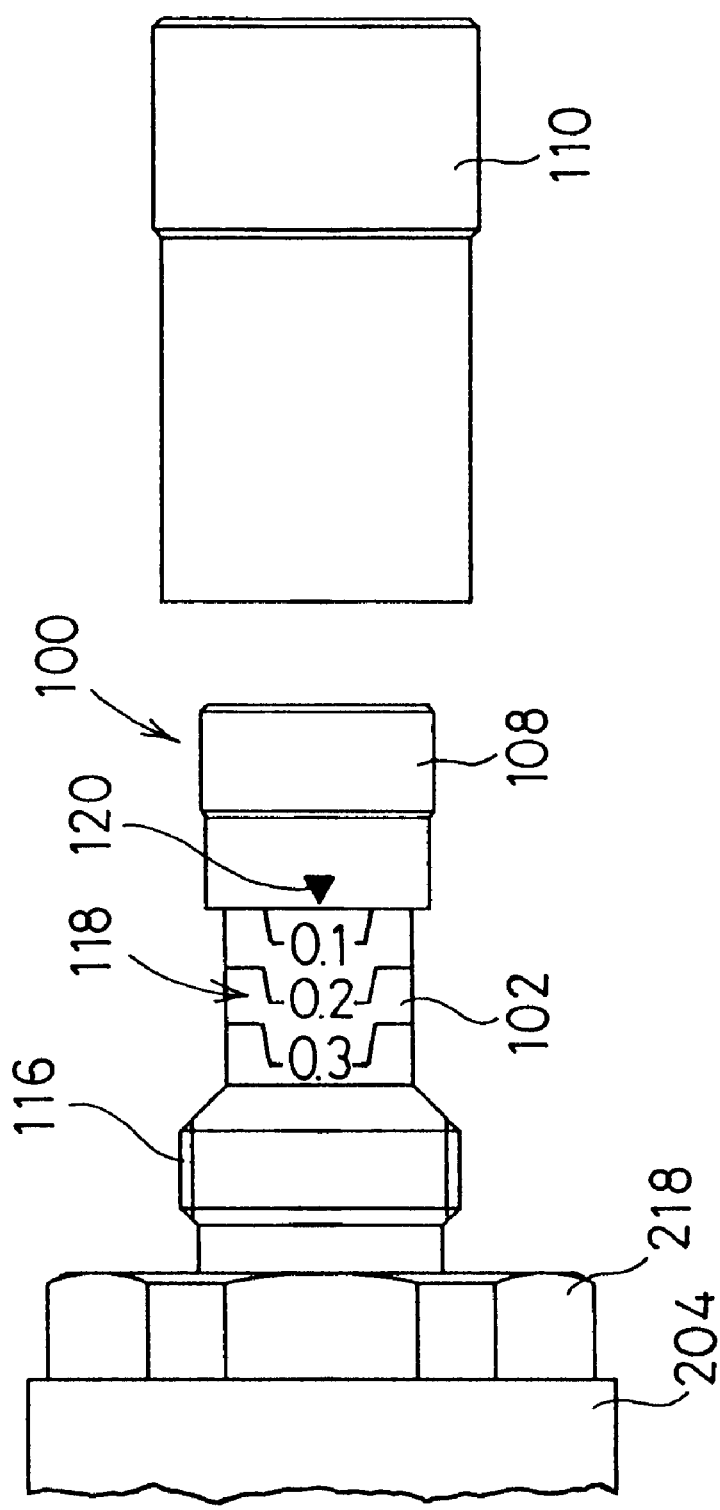
FIG. 4 shows, with partial omission, a side view illustrating a state in which a cover member for constructing the pressure-adjusting mechanism is detached.

The cover member 110 is provided detachably with respect to the cap member 218 (see FIG. 4). That is, as shown in FIG. 2, a first annular projection 114 is formed on the inner circumferential surface on the first end side of the cover member 110, and a second annular projection 116 is formed on the outer circumferential surface of the projection 102. The first annular projection 114 of the cover member 110 is engaged with the second annular projection 116 of the projection 102. Thus, the cover member 110 is installed to the projection 102. On the other hand, when the first annular projection 114 rides over the second annular projection 116 in accordance with the elastic action, and it is displaced in a direction to make separation therefrom, then the cover member 110 can be detached from the projection 102.

As shown in FIGS. 1 and 2, the pressure-adjusting section 214 comprises a valve plug 228 which is arranged coaxially with the pressure-adjusting screw 224, a valve stopper 232 which abuts against a single leg 230 formed at a first end of the valve plug 228, the spring member 222 which is installed between the pressure-adjusting screw 224 and the valve plug 228, for pressing the valve plug 228 toward the valve stopper 232 in accordance with the action of the resilient force, and a second check valve 216 for preventing the pressure fluid supplied from the primary port 24 from flowing toward the secondary port 30.

In this arrangement, when the cover member 110 is detached to rotate the pressure-adjusting handle 108 in a predetermined direction, the pressure-adjusting screw 224 is rotated integrally with the pressure-adjusting screw 108. The pressure-adjusting screw 224 presses the spring member 222, and thus the resilient force of the spring member 222 is adjusted.

As shown in FIG. 4, a pressure-setting scale (pressure-indicating scale) 118, which indicates pressure values such as 1, 2, and 3 that are disposed and separated from each other by predetermined spacing distances, is provided on the outer circumferential surface of the projection 102. The spring constant of the spring member 222 is set beforehand so that the pressure value indicated by the pressure-setting scale 118 corresponds to the secondary pressure, by rotating the pressure-adjusting handle 108. In this arrangement, "0.1" of the pressure-setting scale 118 indicates 0.1 MPa, "0.2" of the pressure-setting scale 118 indicates 0.2 MPa, and "0.3" of the pressure-setting scale 118 indicates 0.3 MPa.

The preset secondary pressure is visually confirmed by reading the numerical value of the pressure-setting scale 118 corresponding to a triangular mark 120 provided on the outer circumferential surface of the pressure-adjusting handle 108.

Figure 5:
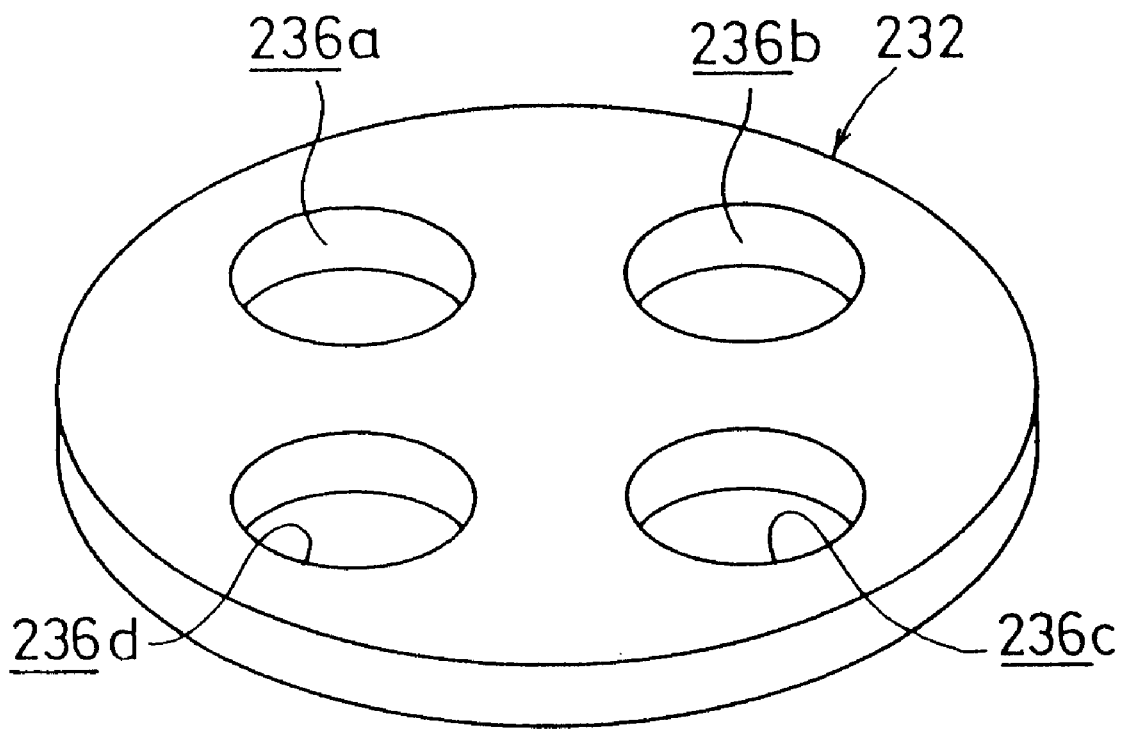
FIG. 5 shows a perspective view illustrating a valve stopper.

The valve stopper 232 is formed to have a substantially disk-shaped configuration. As shown in FIG. 5, centers of a plurality of circular holes 236a to 236d are disposed on a concentric circle. The valve plug 228 abuts against a substantially central portion, and its displacement is regulated thereby.

The valve plug 228 includes a tapered surface 240 which is seated on a seat section 238 against the resilient force of the spring member 222 coated with an elastic material such as rubber, a stem 242 which is connected coaxially with the valve plug 228 in an integrated manner, and a packing 244 which is installed to the stem 242 by the aid of an annular groove.

In this arrangement, the diameter of the packing 244 installed to the stem 242 is formed to be substantially the same as the diameter of the seat section 238. When the secondary pressure led from the secondary port 30 becomes a balanced pressure corresponding to the resilient force of the spring member 222, then the valve plug 228 is displaced in a direction to make separation from the valve stopper 232, and it is seated on the seat section 238.

The first pressure/flow rate control valve 200, to which the pressure-adjusting mechanism 100 according to the embodiment of the present invention is applied, is basically constructed as described above. Next, its operation, function, and effect will be explained.

Figure 6:
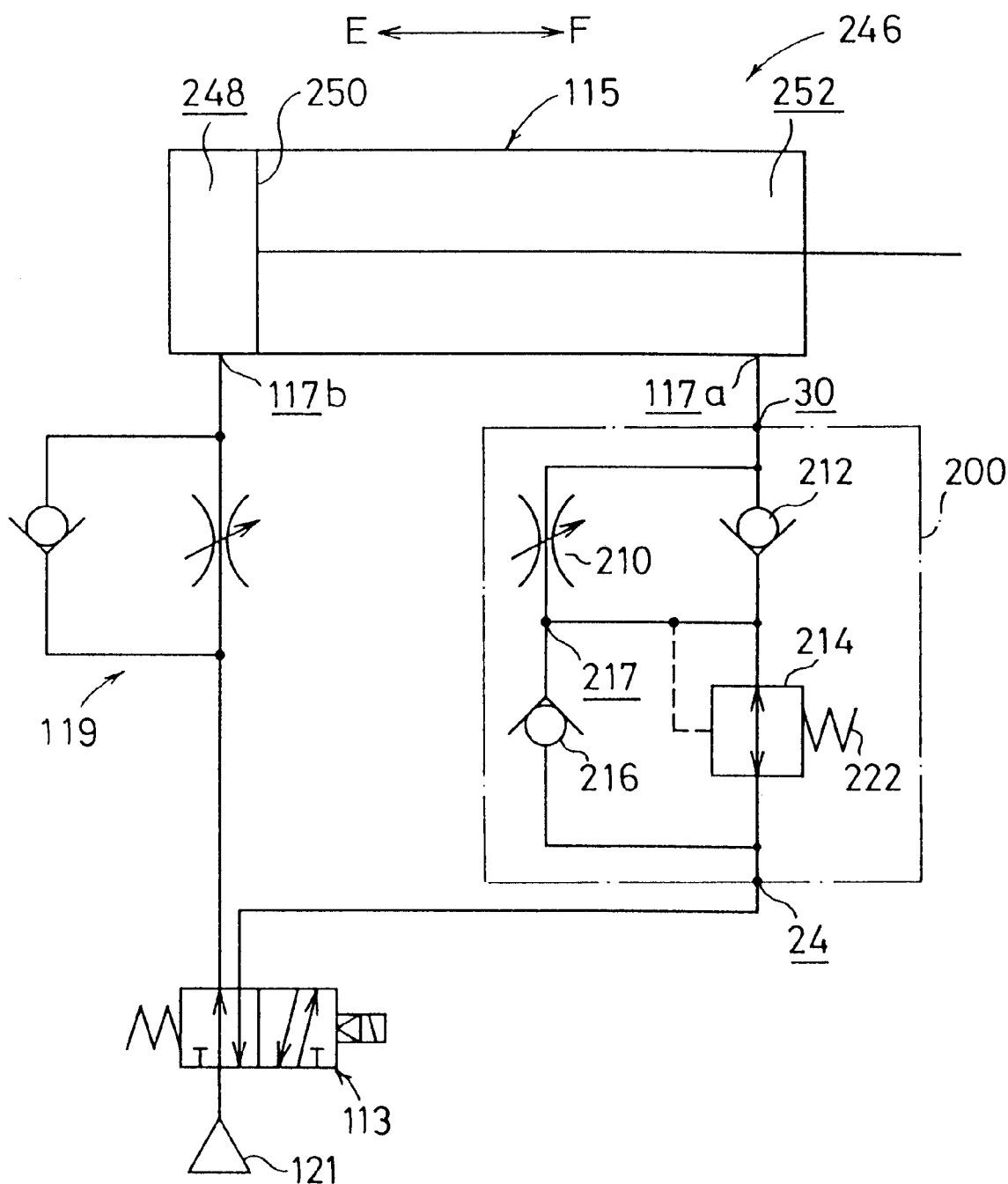
FIG. 6 shows a schematic arrangement of a fluid pressure circuit into which the first pressure/flow rate control valve shown in FIG. 1 is incorporated.

At first, as shown in FIG. 6, a fluid pressure circuit 246 for performing the meter-out control is constructed by using the first pressure/flow rate control valve 200. That is, unillustrated tubes are used so that the primary port 24 of the pressure/flow rate control valve 200 is connected to a directional control valve 113, and the secondary port 30 is connected to a first port 117a of a cylinder 115. Another control valve 119 is inserted between a second port 117b of the cylinder 115 and the directional control valve 113. A pressure fluid supply source 121 is connected to the directional control valve 113.

Subsequently, explanation will be made for a case in which the secondary pressure is adjusted to be a predetermined pressure by using the pressure-adjusting mechanism 100.

When the cover member 110 is detached, and the pressure-adjusting handle 108 is rotated in the predetermined direction, then the pressure-adjusting screw 224 is rotated integrally with the pressure-adjusting handle 108. The pressure-adjusting screw 224 presses the spring member 222, and thus the resilient force of the spring member 222 is adjusted. In this case, the spring constant of the spring member 222 is set beforehand so that the pressure value of the pressure-setting scale 118, which is indicated by the triangular mark 120 provided for the pressure-adjusting handle 108, corresponds to the secondary pressure. Therefore, an operator can rotate the pressure-adjusting handle 108 while visually confirming the pressure-setting scale 118 to set the secondary pressure to be a desired pressure value with ease.

In the flow rate-adjusting mechanism 150, it is enough that the number of revolution-setting scale 162 indicated by the triangular mark 164 is merely read for the number of revolution of the flow rate-adjusting handle 156 which is rotatable in order to control the throttle amount. The operator can make visual confirmation with ease without counting the number of revolution.

In the fluid pressure circuit 246 constructed as described above, the pressure fluid is supplied to a head side cylinder chamber 248 by the aid of the another control valve 119 in accordance with the driving action of the pressure fluid supply source 121. Accordingly, a piston 250 is displaced in the direction of the arrow F. The pressure fluid, which is led from a rod side cylinder chamber 252, is supplied to the secondary port 30 of the first pressure/flow rate control valve 200. The pressure fluid is throttled to give a predetermined flow rate by the flow rate-adjusting section 210, and then it is introduced into the pressure-adjusting section 214 via the communication passage 217.

The throttle amount in the flow rate-adjusting section 210 is previously set in accordance with the spacing distance between the second end 160 of the adjusting screw member 42 and the inner wall surface of the stepped through-hole 152 in accordance with the screwing action of the flow rate-adjusting handle 156.

The pressure fluid, which is introduced into the pressure-adjusting section 214, passes through the holes 236a to 236d of the valve stopper 232. The pressure fluid flows between the tapered surface 240 of the valve plug 228 and the seat section 238, and it is led from the primary port 24. In this process, the secondary pressure, which is supplied from the secondary port 30, is balanced corresponding to the resilient force of the spring member 222, and thus the valve plug 228 is seated on the seat section 238 to give the valve-closed state.

That is, the diameter of the packing 244 installed to the stem 242 is set to be substantially the same as the diameter of the seat section 238. The secondary pressure, which is supplied from the secondary port 30, becomes the balanced pressure corresponding to the resilient force of the spring member 222. Accordingly, the valve plug 228 is displaced, and it is consequently seated on the seat section 238. Therefore, the valve plug 214 is in the valve-closed state, and the flow of the pressure fluid is stopped. As a result, the rod side cylinder chamber 252 is in a state of being held at a predetermined pressure. The piston 250 is displaced up to the terminal end position in the direction of the arrow F in accordance with the action of the pressure fluid held at the predetermined pressure as described above.

A part of the pressure fluid, which is throttled to give the predetermined flow rate by the aid of the flow rate-adjusting section 210, flows while inwardly bending a tongue 109 of the second check valve 216, and it is led from the primary port 24.

The first pressure/flow rate control valve 200 is designed such that, for example, even when the pressure of the rod side cylinder chamber 252 is lower than the preset pressure set by the pressure-adjusting screw 224, then the pressure fluid, which is introduced via the communication passage 217, passes through the second check valve 216, and it is led from the primary port 24. An advantage is obtained such that the speed control can be continuously performed for the piston 250 even in the case as described above.

Further, the first pressure/flow rate control valve 200 is also applicable to an unillustrated fluid pressure circuit to perform the meter-in control by constructing an unillustrated pressure/flow rate control valve in which the first check valve 212 is assembled in a direction opposite to the foregoing direction so that the check action is effected in an opposite direction. In this arrangement, the check direction for the another control valve 119 is set in a direction opposite to the above.

As described above, it is possible to obtain the first pressure/flow rate control valve 200 which is applicable to any one of the fluid pressure circuit 246 to perform the meter-out control and the fluid pressure circuit to perform the meter-in control, by selecting any one of the directions of the first check valve 212 upon the assembling.

In the embodiment of the present invention, the pressure-adjusting mechanism 100 is constructed with the simple structure. Further, it is easy for the operator to set the secondary pressure by rotating the pressure-adjusting handle 108 while visually confirming the pressure-setting scale 118. Further, the provision of the cover member 110 makes it possible to avoid any invasion of dust or the like into the inside and avoid any erroneous operation of the pressure-adjusting handle 108 which would be otherwise caused by any contact or the like, so that the pressure value, which is once set, may be reliably maintained. Further, for example, the provision of the flow rate-adjusting mechanism 150 makes it possible to easily readjust or reset the number of revolution of the adjusting screw member 42.

Figure 7:
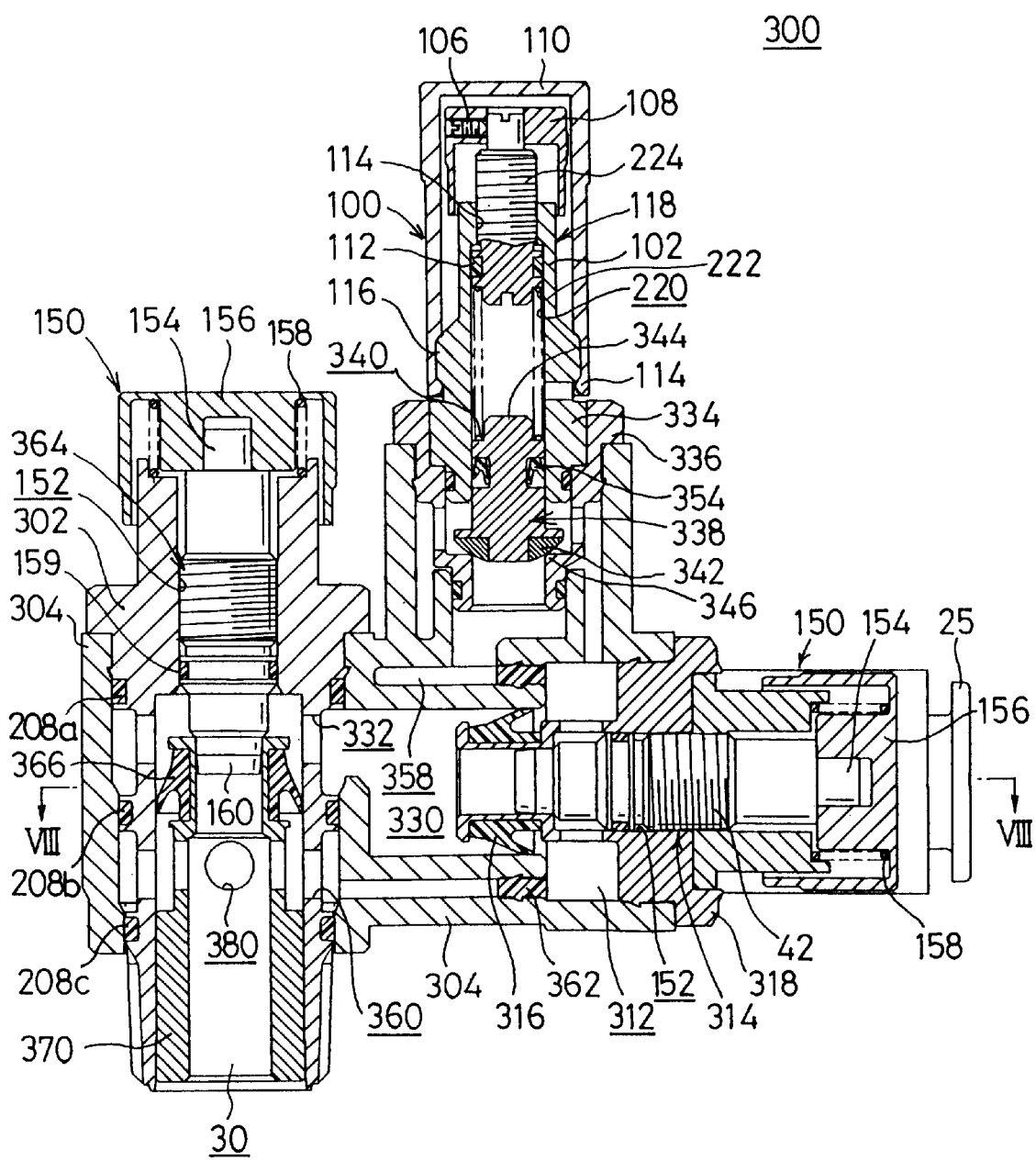
FIG. 7 shows a vertical sectional view taken along an axial direction illustrating a second pressure/flow rate control valve to which a pressure-adjusting mechanism according to an embodiment of the present invention is applied.

Next, FIG. 7 shows a vertical sectional view illustrating an arrangement in which the pressure-adjusting mechanism 100 according to the embodiment of the present invention is applied to a second pressure/flow rate control valve. The same constitutive components are designated by the same reference numerals. Their function and effect are omitted from detailed explanation, because they are the same as those described above.

Figure 8:
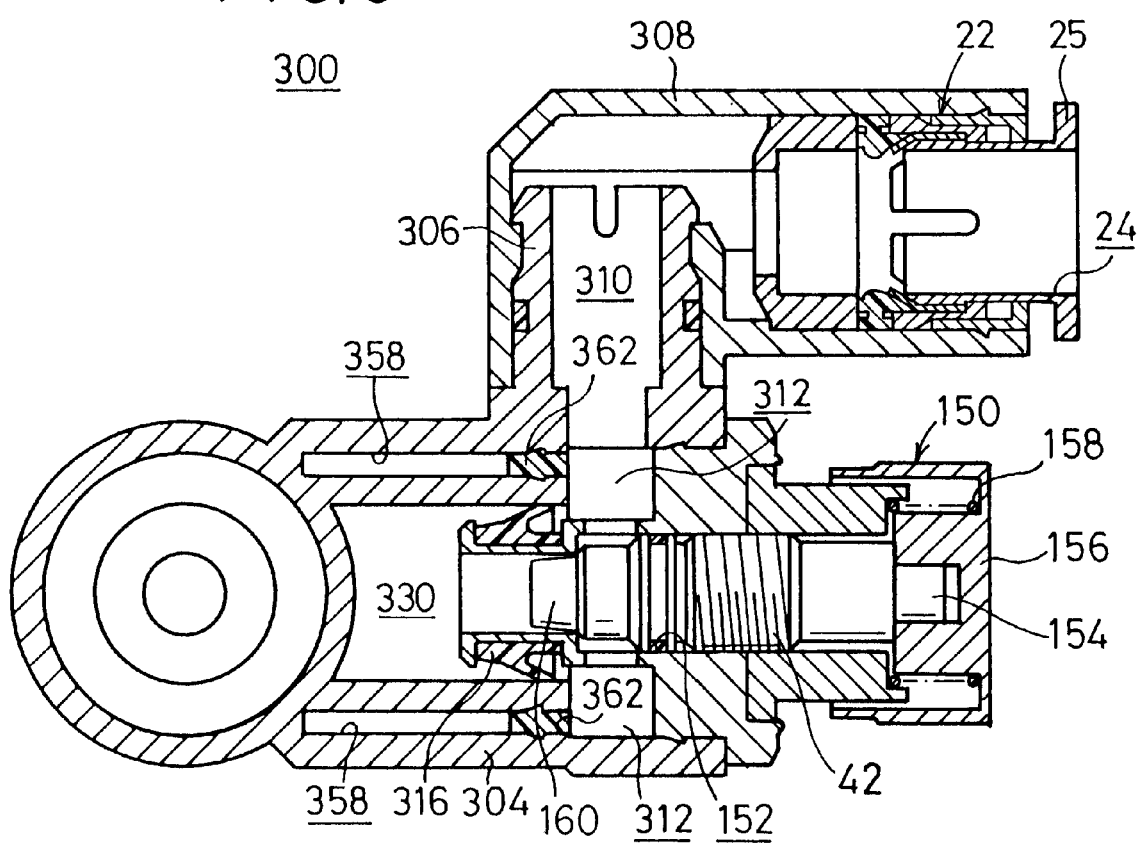
FIG. 8 shows a lateral sectional view taken along a line VIII—VIII shown in FIG. 7.

The second pressure/flow rate control valve 300 comprises a second valve body 304 which includes two substantially cylindrical members connected in an integrated manner in directions substantially perpendicular to one another and which is provided rotatably about a center of rotation of an axis of an internally fitted cylindrical first valve body 302, and a third valve body 308 which has a bent substantially L-shaped configuration and which is connected rotatably about a center of rotation of an axis of a projection 306 (see FIG. 8) of the second valve body 304. The first valve body 302 functions as a first main body section, and the second valve body 304 and the third valve body 308 function as a second main body section.

The third valve body 308 is formed with a sixth passage 310 which is bent along the third valve body 308 and which communicates with the primary port 24. A hole, which substantially functions as the secondary port 30, is formed at the lower end of the first valve body 302.

A first flow rate-adjusting section 314 for throttling the pressure fluid introduced into a sixth chamber 312 communicating with the sixth passage 310 to lead the pressure fluid toward the secondary port 30, and a first check valve 316 for preventing the pressure fluid introduced from the primary port 24 from flowing toward the secondary port 30 are arranged coaxially at the inside of the second valve body 304.

The first flow rate-adjusting section 314 includes a first cap member 318 which is fitted to a hole of the second valve body 304, and a first adjusting screw member 42 which extends along a stepped through-hole 152 formed at a central portion of the first cap member 318 and which is held rotatably in the stepped through-hole 152.

The second end 160 of the first adjusting screw member 42 is formed to have a substantially tapered cross section. The spacing distance between the second end 160 of the first adjusting screw member 42 and the inner wall surface of the stepped through-hole 152 is adjusted by increasing or decreasing the screwing amount of the first adjusting screw member 42. Therefore, the pressure fluid, which is supplied from the primary port 24, is throttled to have a predetermined flow rate in accordance with the spacing distance between the second end 160 of the first adjusting screw member 42 and the inner wall surface of the stepped through-hole 152. The first end of the stepped through-hole 152 is formed to make communication with a first communication passage 332 which is disposed on the upper side and which is formed in the first valve body 302, via a seventh chamber 330.

A second cap member 336 is held on the upper side of the second valve body 304 by the aid of a ring member 334. A valve-opening/closing mechanism 338, which functions as a valve-opening/closing section, is provided for the second cap member 336.

The valve-opening/closing mechanism 338 includes a valve plug 344 which makes sliding movement along a hole 340 formed through the second cap member 336. A resilient body 342 formed of a material such as natural rubber and synthetic rubber to have a substantially tapered cross section is attached to one end of the valve plug 344. The valve-opening/closing mechanism 338 further includes a seat section 346 which is formed for the second cap member 336 and on which the valve plug 344 is seated. A packing 354 having a substantially V-shaped cross section, which is formed of a flexible material, is installed to the valve plug 344 by the aid of an annular groove.

In this arrangement, the diameter of the hole which substantially functions as the seat section 346 is set to be substantially the same as the diameter of the hole 340 of the second cap member 336 in which the valve plug 344 makes sliding movement. In other words, the diameter of the hole of the seat section 346 is set to be substantially the same as the diameter of the hole 340 of the second cap member 336 to provide no difference in pressure-receiving area for the valve plug 344. Accordingly, even when the primary pressure is introduced via a seventh passage 356 communicating with the sixth chamber 312, then the valve plug 344 is in the balanced state, and it is held in the state of being seated on the seat section 346.

An annular passage 358, which extends in the circumferential direction of the second valve body 304, is formed on the lower side of the seat section 346. The annular passage 358 is provided to make communication with the secondary port 30 via a second communication passage 360 disposed on the lower side. An annular seal member 362 is installed between the annular passage 358 and the sixth chamber 312 to give a non-communication state.

A second flow rate-adjusting section 364 for throttling the pressure fluid led via the first communication passage 332 to give a predetermined flow rate and leading the pressure fluid toward the secondary port 30, and a second check valve 366 for preventing the pressure fluid introduced from the secondary port 30 from flowing toward the primary port 24 are arranged coaxially at the inside of the first valve body 302.

A second check valve 366 is externally fitted to a first end of a cylindrical member 370. The second check valve 366 is deformed in accordance with the action of the pressure fluid supplied from the secondary port 30 and introduced via a circular hole 380, and its tongue makes contact with the inner wall surface of the first valve body 302. Accordingly, the pressure fluid is prevented from flowing toward the primary port 24. On the other hand, the tongue is bent inwardly in accordance with the action of the pressure fluid having passed through the first communication passage 332. Accordingly, the pressure fluid, which has passed through the first communication passage 332, is led toward the secondary port 30.

The second pressure/flow rate control valve 300, to which the pressure-adjusting mechanism 100 according to the embodiment of the present invention is applied, is basically constructed as described above. Next, its operation, function, and effect will be explained.

FIG. 10 shows the relationship concerning the displacement amount of the piston 424 and the pressures of the head side cylinder chamber 422 and the rod side cylinder chamber 426 of the cylinder 414, with respect to the second pressure/flow rate control valve 300, wherein $P_H$ indicates a characteristic curve of the pressure in the head side cylinder chamber 422, and $P_R$ indicates a characteristic curve of the pressure in the rod side cylinder chamber 426. Explanation will be made below for the operation of the second pressure/flow rate control valve 300 in relation to the characteristic curves $P_H$ and $P_R$.

Figure 9:
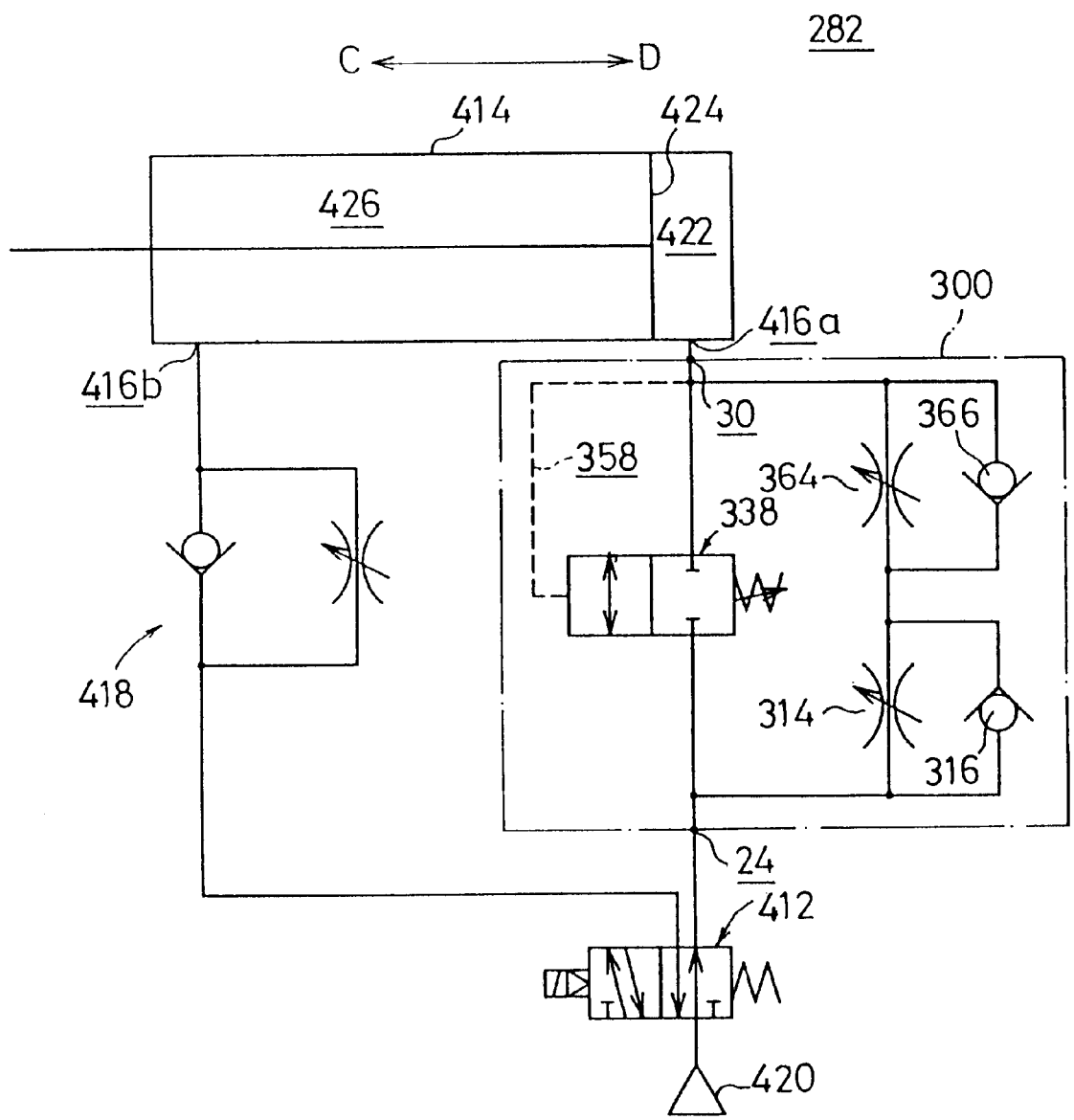
FIG. 9 shows a circuit construction to perform the meter-out control to which the second pressure/flow rate control valve shown in FIG. 7 is incorporated.

At first, the second pressure/flow rate control valve 300 is incorporated to construct a fluid pressure circuit 382 as shown in FIG. 9. In the fluid pressure circuit 382, the pressure fluid (for example, compressed air) is supplied via the primary port 24 in accordance with the driving action of a pressure fluid supply source 420. In this situation, the valve plug 344 is in the valve-closed state, in which the valve plug 344 is seated on the seat section 346 in accordance with the resilient force of the spring member 222.

The pressure fluid, which is supplied via the primary port 24, is introduced into the valve-opening/closing mechanism 338 via the sixth passage 310, the sixth chamber 312, and the seventh passage 356. However, as described above, the diameter of the hole of the seat section 346 is set to be substantially the same as the diameter of the hole 340 of the second cap member 336 to give no difference in pressure-receiving area for the valve plug 344. Therefore, even when the primary pressure is introduced into the valve-opening/closing mechanism 338, then the valve plug 344 is in the balanced state, and it is held in the state of being seated on the seat section 346.

On the other hand, the pressure fluid, which is supplied via the primary port 24, is introduced into the first flow rate-adjusting section 314 via the sixth passage 310 and the sixth chamber 312. The pressure fluid is throttled to give a predetermined flow rate, and then it is introduced into the second flow rate-adjusting section 364 via the seventh chamber 330 and the first communication passage 332. The pressure fluid, which is introduced into the sixth chamber 312, is prevented from flowing toward the secondary port 30 in accordance with the check action of the first check valve 316.

The pressure fluid, which is introduced into the second flow rate-adjusting section 364, is throttled to give a predetermined flow rate, and then it is introduced into the head side cylinder chamber 422 of the cylinder 414 via the circular hole 380 and the secondary port 30. The piston 424 is displaced in the direction of the arrow C up to the first terminal end position.

As described above, the pressure fluid, which is supplied to the head side cylinder chamber 422 of the cylinder 414, is sufficiently throttled for its flow rate by the aid of the first flow rate-adjusting section 314 and the second flow rate-adjusting section 364. Therefore, even when the pressure of the rod side cylinder chamber 426 is low, it is possible to reliably avoid the occurrence of the so-called jumping out phenomenon of the piston (see the characteristic curve A1 shown in FIG. 10).

Subsequently, the piston 424 arrives at the first terminal end position, and then the pressure of the head side cylinder chamber 422 is increased. The pressure fluid having the high pressure is introduced into the valve-opening/closing mechanism 338 via the secondary port 30, the second communication passage 360, and the annular passage 358. The valve plug 344 is moved upwardly, and it is separated from the seat section 346. Accordingly, the valve-opening/closing mechanism 338 is in the valve-open state.

Therefore, the pressure fluid, which is introduced from the primary port 24, is quickly supplied to the head side cylinder chamber 422 of the cylinder 414 (see the characteristic curve A2 shown in FIG. 10) via the sixth passage 310, the sixth chamber 312, the seventh passage 356, the annular passage 358, the second communication passage 360, the circular hole 380, and the secondary port 30 which are communicated with each other. As a result, the piston 424 arrives at the first terminal end position, and then the valve-opening/closing mechanism 338 is operated. Thus, it is possible to quickly supply the pressure fluid having the high pressure to the head side cylinder chamber 422. Therefore, for example, when the present invention is applied to an unillustrated clamp cylinder, it is possible to suddenly increase the force to clamp a workpiece by means of an arm.

Subsequently, when the valve position of the directional control valve 412 is switched to displace the piston 424 in a direction (direction of the arrow D) opposite to the above, the valve plug 344 is in the valve-open state in which the valve plug 344 is separated from the seat section 346, because the pressure of the head side cylinder chamber 422 is high. The pressure fluid, which is introduced from the secondary port 30, is quickly discharged from the directional control valve 412 to the atmospheric air via the circular hole 380, the second communication passage 360, the annular passage 358, the seventh passage 356, the sixth chamber 312, the sixth passage 310, and the primary port 24 which are communicated with each other (see the characteristic curve A3 shown in FIG. 10).

Therefore, the secondary pressure is lowered to be not more than the predetermined pressure which is set by the resilient force of the spring member 222. Accordingly, the valve plug 344 is seated on the seat section 346 to give the valve-closed state. As a result, the pressure fluid, which is supplied from the head side cylinder chamber 422 of the cylinder 414 to pass through the secondary port 30, is throttled to give a predetermined flow rate by the aid of the second flow rate-adjusting section 364 and the first flow rate-adjusting section 314. After that, the pressure fluid is led from the primary port 24. Thus, the displacement speed of the piston 424 is controlled.

As described above, it is possible to reliably avoid the occurrence of the so-called jumping out phenomenon of the piston 424. Further, after the piston 424 arrives at the first terminal end position, the primary pressure can be quickly supplied, and the secondary pressure can be quickly discharged. Therefore, the delay of pressure transmission is dissolved.

Next, a characteristic curve of a pressure/flow rate control valve (not shown) concerning Comparative Example is shown in FIG. 11. As clearly understood from FIG. 11, the pressure value of the pressure fluid supplied to the head side cylinder chamber 422 of the cylinder 414 is suddenly increased in Comparative Example. Therefore, the so-called jumping out phenomenon of the piston 424 occurs.

On the contrary, as shown in FIG. 10, in the another embodiment, the flow rate of the pressure fluid supplied from the primary port 24 is throttled by the first flow rate-adjusting section 314 and the second flow rate-adjusting section 364. Therefore, the sudden increase of the pressure of the pressure fluid supplied to the head side cylinder chamber 422 of the cylinder 414 is suppressed. The occurrence of the so-called jumping out phenomenon of the piston 424 is avoided.

What is claimed is:

1. A pressure-adjusting mechanism constructed integrally with a pressure control valve, for adjusting a secondary pressure controlled by said pressure control valve, said pressure-adjusting mechanism comprising:

a pressure-adjusting handle;

a pressure-adjusting screw for adjusting resilient force of a pressure-adjusting spring by making rotation integrally with said pressure-adjusting handle, wherein said pressure-adjusting screw is provided displaceably in an axial direction and rotatably in a circumferential direction, and is fixed at an arbitrary position in said axial direction and in said circumferential direction by the aid of a fixing screw provided for said pressure adjusting handle; and a pressure indicating scale for indicating a preset pressure value by rotating said pressure-adjusting handle in a predetermined direction, wherein said pressure control valve comprises a flow-rate adjusting mechanism internally fitted and rotatably attached to a valve body of said pressure control valve.

2. The pressure-adjusting mechanism according to claim 1, wherein said flow rate-adjusting mechanism is provided with a number of revolution-indicating scale for indicating a number of revolution of a flow rate-adjusting handle for adjusting a throttle amount.

3. The pressure-adjusting mechanism according to claim 1, wherein a cover member for surrounding said pressure-adjusting handle is detachably installed.

4. The pressure-adjusting mechanism according to claim 1, wherein said pressure-adjusting screw is provided with a loosening-preventative member for avoiding any loosening in said axial direction and in said circumferential direction of said pressure-adjusting handle.

5. The pressure-adjusting mechanism according to claim 1, wherein said pressure-adjusting spring has a spring constant which is set so that a pressure value indicated by said pressure-indicating scale corresponds to a secondary pressure by rotating said pressure-adjusting handle.

6. The pressure-adjusting mechanism according to claim 1, wherein said pressure-adjusting handle is provided with a mark for indicating a numerical value of said pressure-indicating scale corresponding to a preset secondary pressure.

7. The pressure-adjusting mechanism according to claim 2, wherein said flow rate-adjusting handle is provided with a mark for indicating a numerical value of said number of revolution-indicating scale corresponding to said number of revolution of said flow rate-adjusting handle.

* * * * *